(12) United States Patent
Lee

(10) Patent No.: US 7,993,517 B2
(45) Date of Patent: Aug. 9, 2011

(54) AUTOMATICALLY CLEANED FILTER

(76) Inventor: Tsung-Hui Lee, Taoyuan Hsien (TW)

(*) Notice: Subject to any disclaimer, the term of this patent is extended or adjusted under 35 U.S.C. 154(b) by 28 days.

(21) Appl. No.: 12/652,015

(22) Filed: Jan. 4, 2010

(65) Prior Publication Data

US 2011/0163026 A1 Jul. 7, 2011

(51) Int. Cl.
*B01D 33/073* (2006.01)
*B01D 33/37* (2006.01)
*B01D 33/46* (2006.01)
*B01D 29/64* (2006.01)

(52) U.S. Cl. ........ 210/232; 210/326; 210/330; 210/332; 210/396; 210/397; 210/402; 210/436

(58) Field of Classification Search ............... 210/232, 210/326, 330, 332, 396, 397, 402, 436
See application file for complete search history.

(56) References Cited

U.S. PATENT DOCUMENTS

| | | | | | |
|---|---|---|---|---|---|
| 2,136,853 | A | * | 11/1938 | Knecht | 210/397 |
| 3,784,017 | A | * | 1/1974 | Arnold et al. | 210/354 |
| 5,387,339 | A | * | 2/1995 | Lee et al. | 210/326 |
| 5,514,265 | A | * | 5/1996 | Nowak et al. | 210/136 |
| 5,543,087 | A | * | 8/1996 | Lee et al. | 261/87 |
| 5,670,043 | A | * | 9/1997 | Lee | 210/396 |

* cited by examiner

*Primary Examiner* — Thomas M Lithgow

(57) ABSTRACT

An automatically cleaned filter comprises a motor; a base above the motor; the base being formed with at least one filter seat, a water inlet, a water draining hole and an annular groove; at least one filter core installed on a respective one of the filter seat; the filtering material being formed on an outer side of the filter core; a cleaning unit installed on a center portion of the base; a bottom of the cleaning unit being connected to the spindle; a gear being installed at an upper side of the base and being engaged to the spindle; an upper cover combined to the base by using at least one supporting posts; a lower side of each filter core being installed with a gear; and the gear at the lower side of the filter core being engaged to the gear of the cleaning unit.

4 Claims, 8 Drawing Sheets

AUTOMATICALLY CLEANED FILTER

FIELD OF THE INVENTION

The present invention related to filters, and particularly to an automatically cleaned filter.

BACKGROUND OF THE INVENTION

Currently, body health and environment protection are more and more emphasized in human life. Water filters have become a necessary device in daily life. In the prior art filter, the filtering core is needed to be updated as it is used for a long time. However this is inconvenient. Furthermore, users must check the state of the filter for replacement. However this also induces another inconvenience in use of the filter.

SUMMARY OF THE INVENTION

The present invention relates to an automatically cleaning filter, comprising: a motor having a spindle; a base at an upper side of the motor; the base 1 being formed with at least one filter seat, a water inlet, a water draining hole and an annular groove; at least one filter core installed on a respective one of the at least one filter seat; the filtering material being formed on an outer side of the filter core; a cleaning unit installed on a center portion of the base; a bottom of the cleaning unit being connected to the spindle; a gear being installed at an upper side of the base and being engaged to the spindle; an upper cover combined to the base by using at least one supporting posts for fixing the filter core and the cleaning unit; a lower side of each filter core being installed with a gear; the gear at the lower side of the filter core being engaged to the gear; an outer cover combined to the base by using at least one retaining posts and being at an upper side of the upper cover; the outer cover being formed with an air valve; a water outlet and an engaging groove which is formed at a lower side of the outer cover; and an outer casing embedded to the annular groove of the base and the engaging groove of the outer cover so as to form a casing for containing the filter core and the cleaning unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
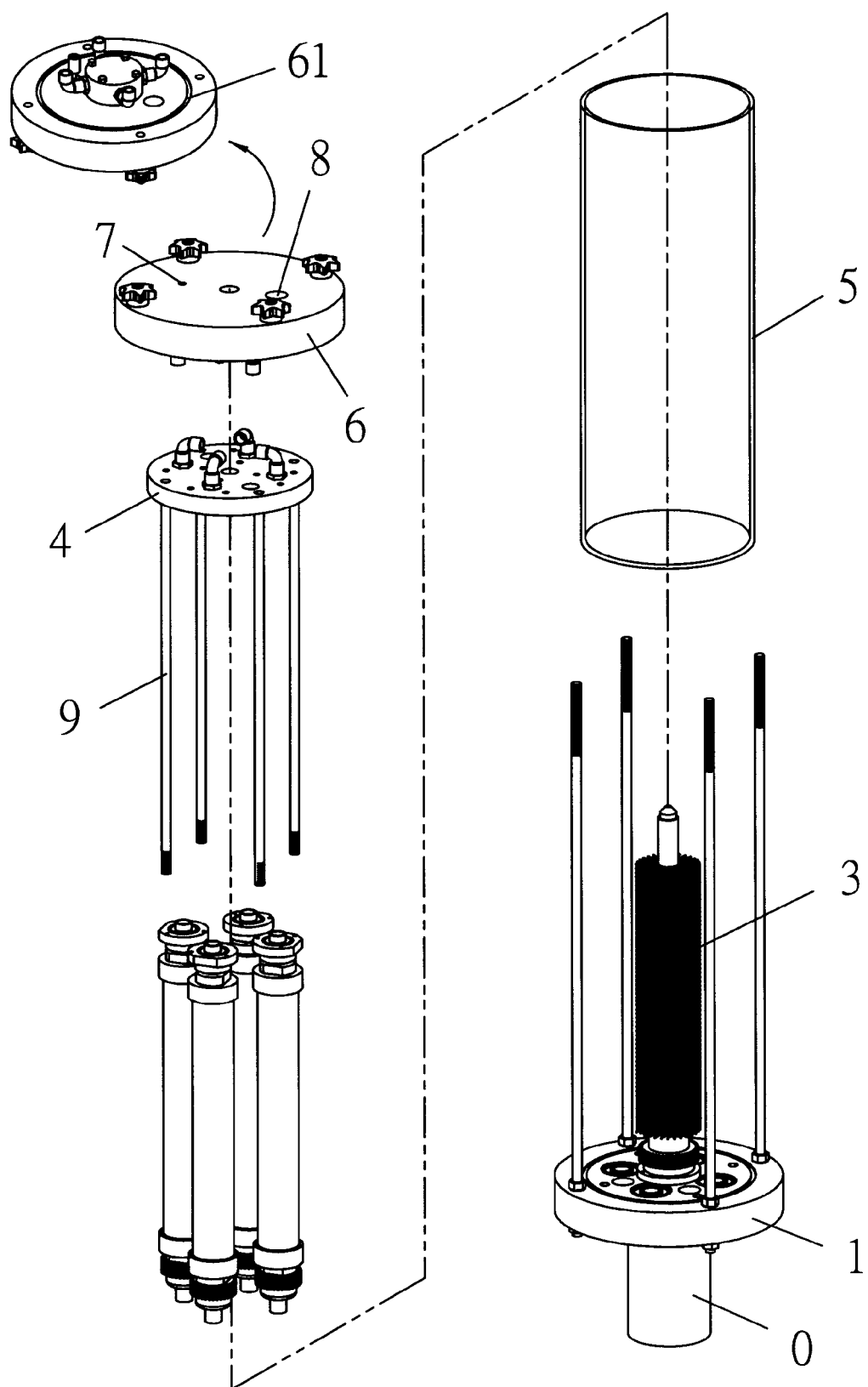
FIG. 1 is an exploded view of the filter of the present invention.
Figure 2:
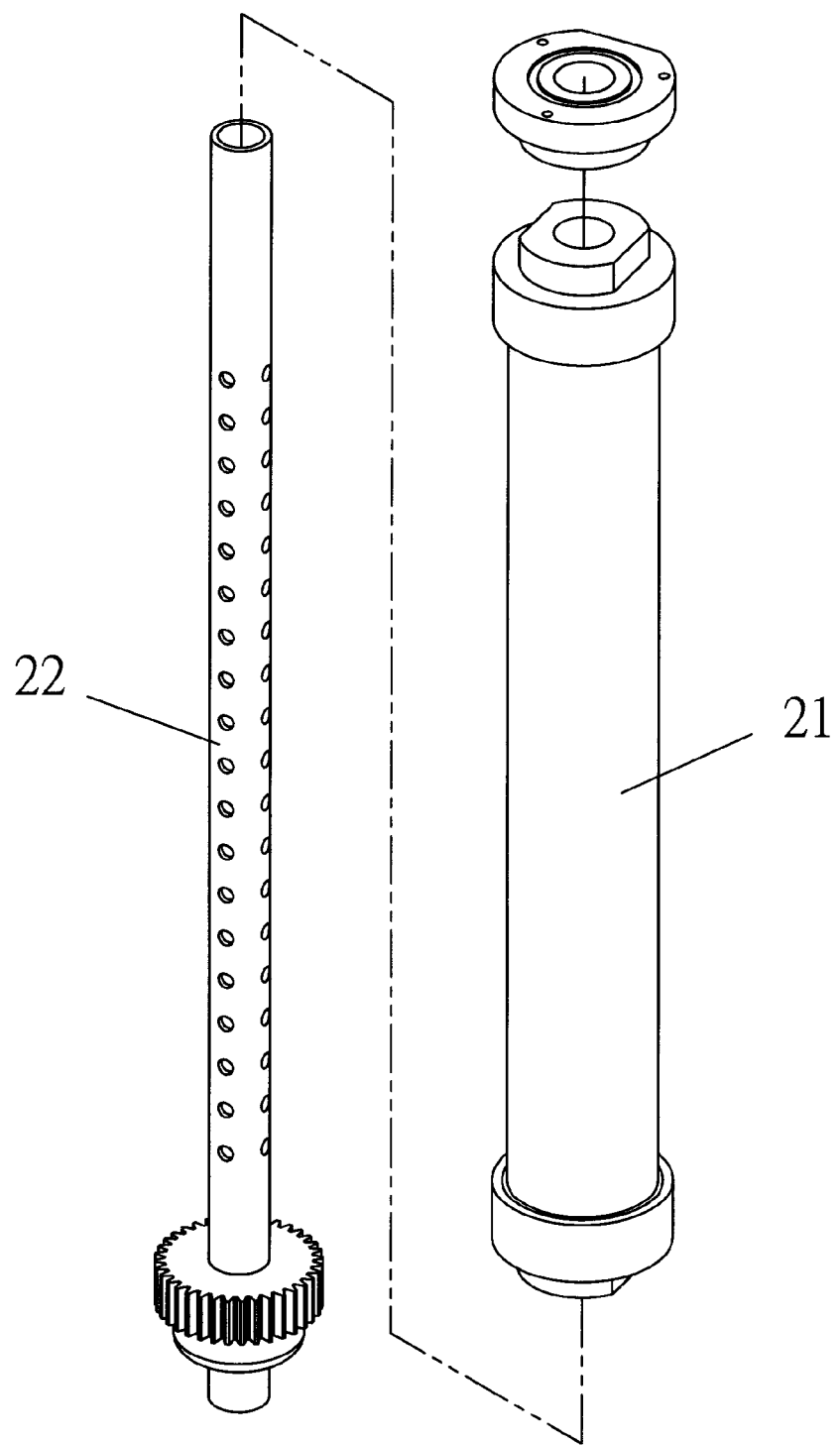
FIG. 2 is a partial exploded view of the present invention.
Figure 3:
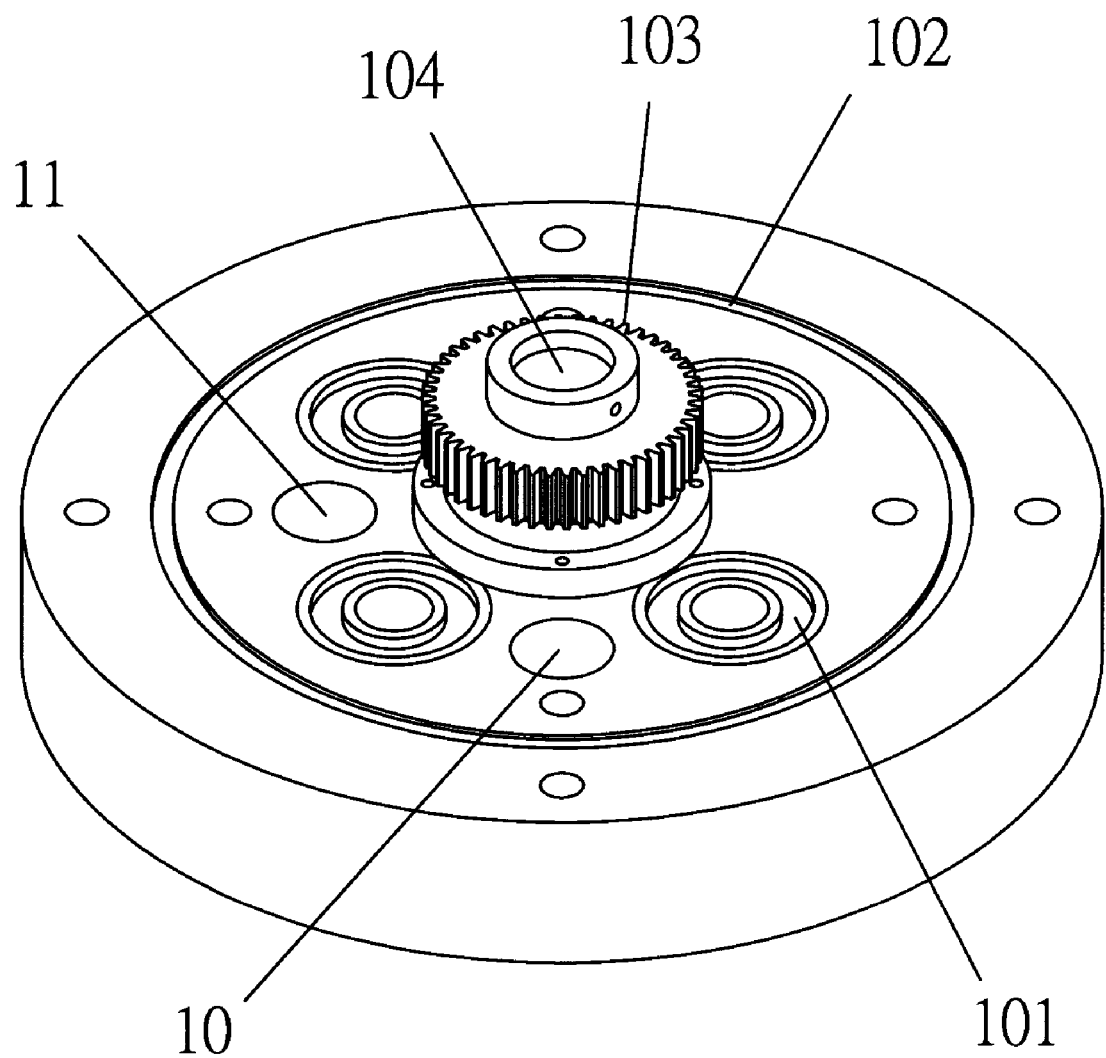
FIG. 3 is a partial enlarged view of the present invention.
Figure 4:
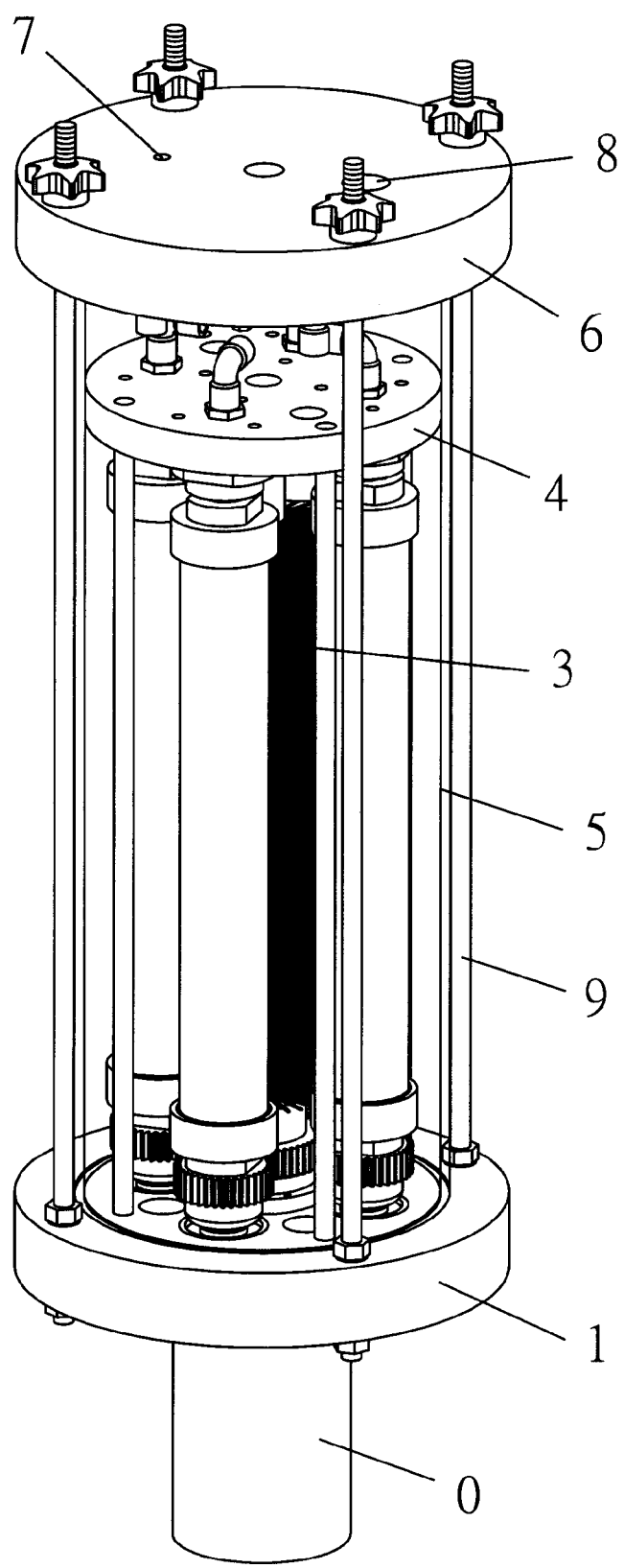
FIG. 4 is an assembled perspective view of the present invention.

With referring to FIGS. 1 to 3, the structure of the present invention is illustrated. The present invention has the following elements.

A motor 0 has a spindle 104.

A base 1 is installed at an upper side of the motor 0. The base 1 is formed with at least one filter seat 101, a water inlet 10, a water draining hole 11 and an annular groove 102.

At least one filter core 22 is installed on a respective one of the at least one filter seat 101. The filtering material 21 is formed on an outer side of the filter core 22.

A cleaning unit 3 is installed on a center portion of the base 1. A bottom of the cleaning unit 3 is connected to the spindle 104. A gear 103 is installed at an upper side of the base 1 and is engaged to the spindle 104.

An upper cover 4 is combined to the base 1 by using at least one supporting posts 9 for fixing the filter core 22 and the cleaning unit 3. A lower side of each filter core 22 is installed with a gear. The gear at the lower side of the filter core 22 is engaged to the gear 103. Thus when the motor 0 is actuated. The spindle 104 will drive the cleaning unit 3 to rotate and then the filter cores 22 will rotate therewith and thus, the filter core 22 is cleaned.

An outer cover 6 is combined to the base 1 by using at least one retaining posts and is at an upper side of the upper cover 4. The outer cover 6 is formed with an air valve 7, a water outlet 8 and an engaging groove 61 which is formed at a lower side of the outer cover 6.

An outer casing 5 is embedded to the annular groove 102 of the base 1 and the engaging groove 61 of the outer cover 6 so as to form a casing for containing the filter core 22 and the cleaning unit 3.

Figure 5:
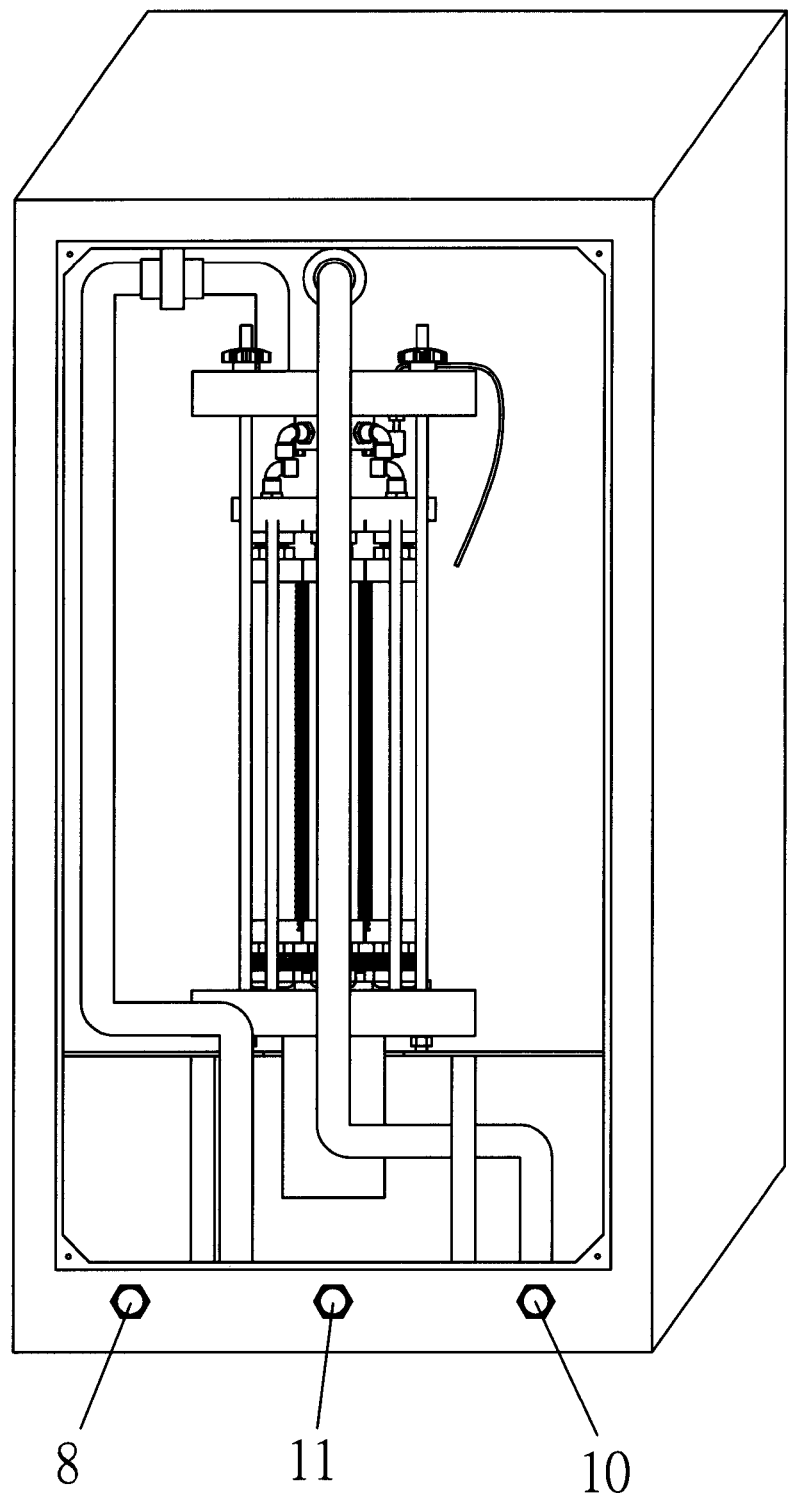
FIG. 5 is a schematic view showing an interior of the present invention.
Figure 6:
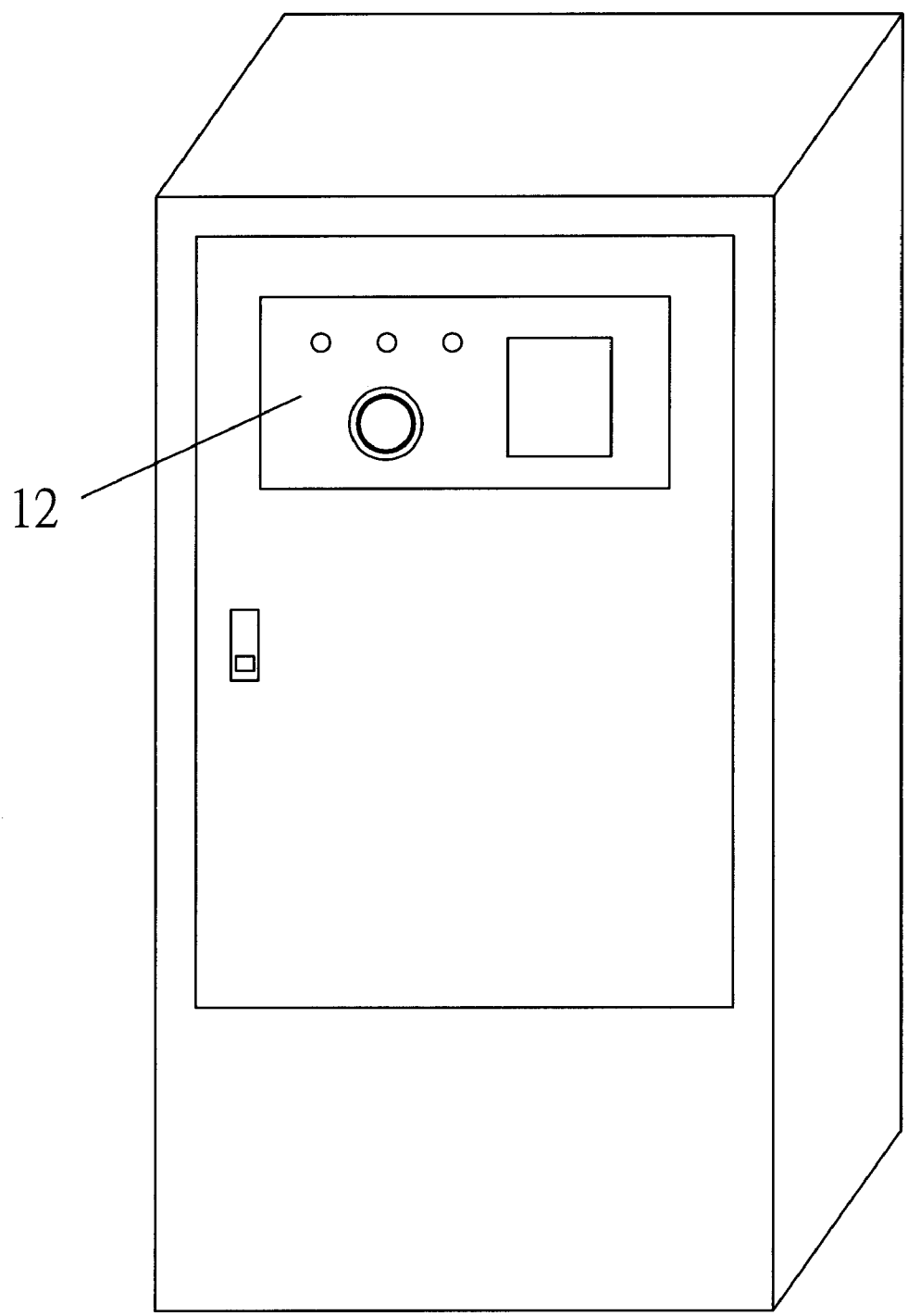
FIG. 6 shows the outlook of the present invention.
Figure 7:
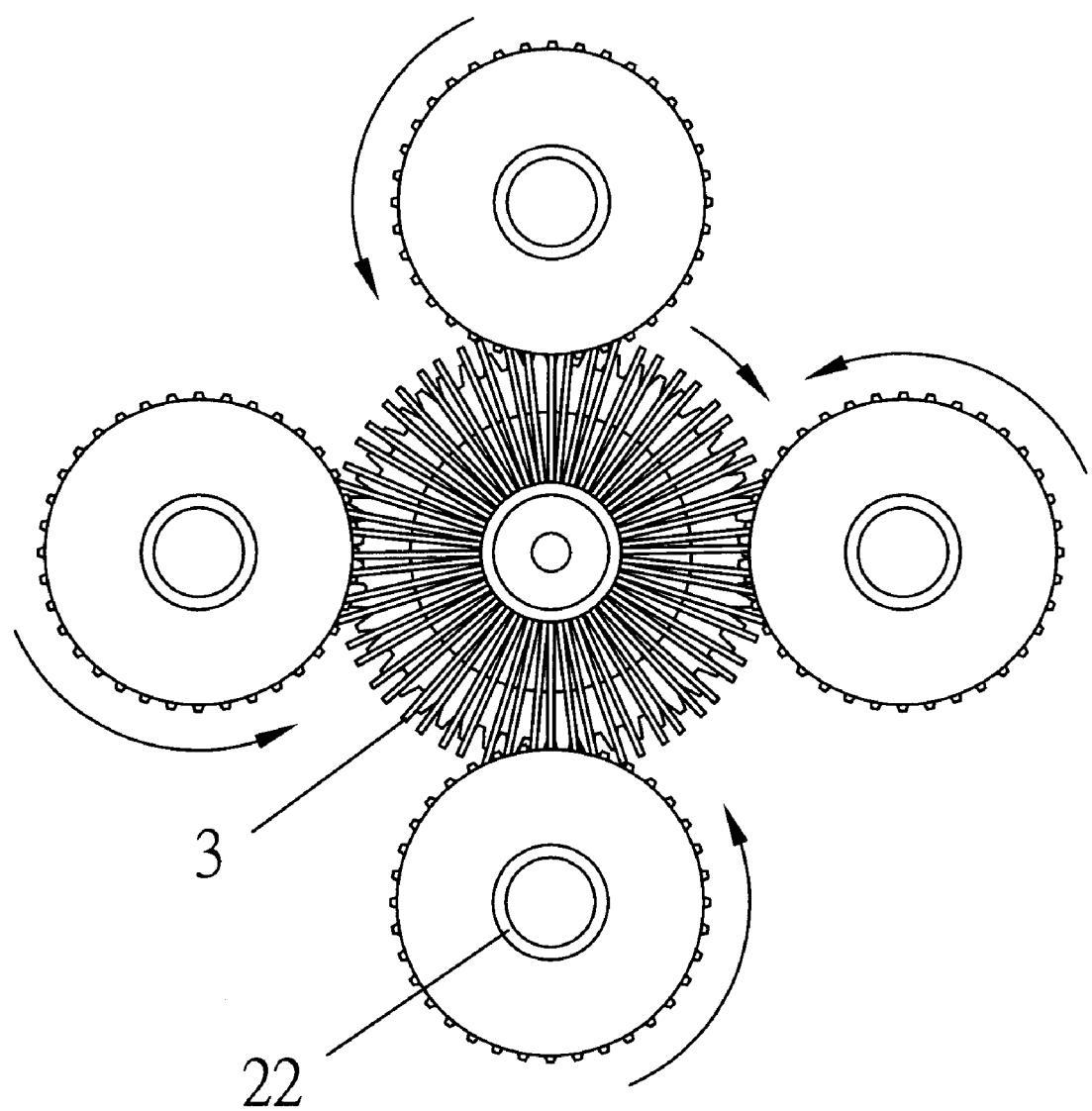
FIG. 7 is a schematic view showing the washing operation according to the present invention.

Referring to FIGS. 5 to 7, when the present invention is used for a predetermined time, a control panel 12 will show that the water flow form the filter is reduced. Then the motor 0 will actuated. The spindle 104 will drive the cleaning unit 3 to rotate and then the filter cores 22 will rotate therewith and thus, the filter core 22 is cleaned.

Figure 8:
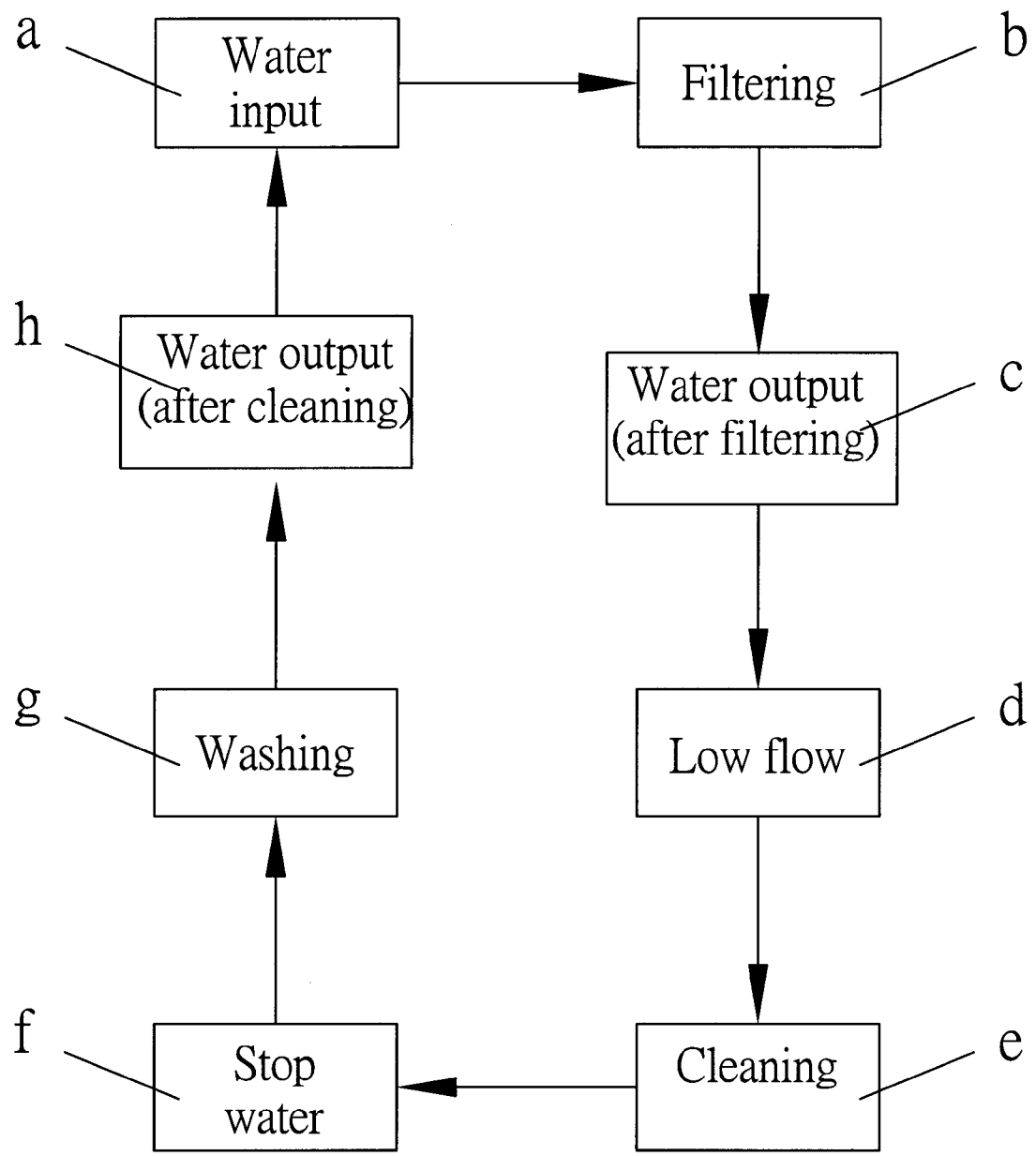
FIG. 8 shows the process of cleaning and filtering of the present invention.

Referring to FIG. 8, the cleaning process of the present invention is illustrated. In step a, water flowing into the filter and the air valve 7 is opened for processing the process of filtering (step b) and the water inlet 10 is opened for outputting water (step c). After the filter is used for a time period, the filtering material at an outer side of the filter core 22 will be dirt and is obstructed so that the flow rate is reduced (step d). Thus the washing process is performed (step e). At this moment, water is stopped to flow into the filter and the water outlet 8 is closed (step f). In step g, the cleaning unit 3 is actuated for washing. When dirt water is drain out from the water draining hole 11. The water draining hole 11 is closed (step h). Then the process returns to step a for filtering.

Advantage of the present invention is that the work for washing the filter cores is performed automatically without manual works. The detection of the filter cores are performed automatically at a predetermined time period.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automatically cleaned filter, comprising:

a motor having a spindle;

a base at an upper side of the motor; the base being formed with at least one filter seat, a water inlet, a water draining hole and an annular groove;

at least one filter core installed on a respective one of the at least one filter seat; the filtering material being formed on an outer side of the filter core;

a cleaning unit installed on a center portion of the base; a bottom of the cleaning unit being connected to the spindle; a gear being installed at an upper side of the base and being engaged to the spindle;

an upper cover combined to the base by using at least one supporting post for fixing the filter core and the cleaning unit; a lower side of each filter core being installed with a gear; the gear at the lower side of the filter core being engaged to the gear;

an outer cover combined to the base by using at least one retaining post and being at an upper side of the upper cover; the outer cover being formed with an air valve; a water outlet and an engaging groove which is formed at a lower side of the outer cover; and an outer casing embedded to the annular groove of the base and the engaging groove of the outer cover so as to form a casing for containing the filter core and the cleaning unit.

2. The filter as claimed in claim 1, wherein the cleaning unit is a brush.

3. The filter as claimed in claim 1, wherein in cleaning, the cleaning unit is unmoved, while the filter core moves.

4. The filter as claimed in claim 1, wherein in cleaning, the cleaning unit is moved, while the filter core is unmoved.

* * * * *